July 7, 1970            R. L. CALDER            3,518,842

FISH PACKING SYSTEM

Filed June 3, 1968                                      4 Sheets-Sheet 1

ROBERT L. CALDER
INVENTOR
Jacobi & Davidson
ATTORNEYS.

July 7, 1970 R. L. CALDER 3,518,842
FISH PACKING SYSTEM
Filed June 3, 1968 4 Sheets-Sheet 2

ROBERT L. CALDER
INVENTOR
Jacobi & Davidson
ATTORNEYS.

July 7, 1970 R. L. CALDER 3,518,842
FISH PACKING SYSTEM

Filed June 3, 1968 4 Sheets-Sheet 3

ROBERT L. CALDER
INVENTOR

Jaeshi & Davidson
ATTORNEYS.

July 7, 1970     R. L. CALDER     3,518,842

FISH PACKING SYSTEM

Filed June 3, 1968     4 Sheets-Sheet 4

ROBERT L. CALDER
INVENTOR
Jacobi & Davidson
ATTORNEYS.

United States Patent Office
3,518,842
Patented July 7, 1970

3,518,842
FISH PACKING SYSTEM
Robert L. Calder, Lennoxville, Quebec, Canada, assignor to General Plastics Company Limited, Cookshire, Quebec, Canada
Filed June 3, 1968, Ser. No. 734,158
Claims priority, application Canada, Apr. 18, 1968, 17,769
Int. Cl. F25d 3/08; B65d 81/18
U.S. Cl. 62—372                7 Claims

ABSTRACT OF THE DISCLOSURE

Fresh fish fillets are packed in flat boxes which hold them firmly while preventing loss of fish water and mixing with melting ice. A complete system adapted for cooling and shaping food products consists of one or more flat boxes in a loose waterproof overwrap bag together with ice in a protective box.

---

This invention relates to the packing and shipping of fish products such as fresh fish fillets, and containers suited thereto.

Fresh fish fillets have conventionally been shipped from the fishing area to the markets in wooden boxes which have been filled with fish and nailed shut by hand. This method of packing was originally conceived some half a century ago. The fish are normally packed in 10 lb. and 20 lb. boxes, and these boxes are constructed from pine wood and are fitted with a wooden cover. About 22 lbs. of fish are loaded into a 20 lb. box and the cover is then nailed in place. As the fish is compressed by the closing operation and as the box is not water proof, there is normally a drip loss of approximately two lbs. in transit. The fish fillets are placed in the old boxes under considerable pressure so as to prevent them from tangling or otherwise rolling over in the box. Such rolling results in damage to the fish fillets with considerable loss in salability.

The additional loading of about 2 lbs. of fish per box is necessary so that there will be approximately 19½ to 20 lbs. of fish in the box when it reaches the retailer. This loss of fish juices is obviously undesirable. For example, it results in a loss in flavour of the fish, and the run-off which, of course, is strongly flavoured by the smell of fish, results in much higher cost for shippers since special box cars and trucks must be employed only for fish.

The usual practice today consists of placing eight 20 lb. boxes or approximately 160 lbs. of fish in a large wooden crate. The crate itself weighs fifteen to twenty pounds, the wooden boxes of fish are placed in this crate along with 240 lbs. of ice. The wood of the containers is not a particularly good insulator and large amounts of ice are necessary. This seriously reduces the available payload in shipment of fish and represents an additional factor tending to increase the cost of shipping fresh fish.

In accordance with one aspect of the present invention, there is provided a box adapted for packing and shipping a plurality of fish, and comprising a flat top and a container portion, said top being formed of thermoplastic material, said container portion being formed of rigid thermoplastic material such as polyethylene, and having a bottom, side walls and end walls, said side walls and end walls cooperating at their upper edge with said top and forming a water-tight seal therewith, and said bottom being bowed inwardly. The bowed bottom should have rigidity such that when flattened, it exerts an appreciable inward pressure, said pressure being less than the weight of the contents of the box.

The present invention preferably further provides such a box wherein said side walls and said end walls taper downwardly and inwardly whereby to provide for stacking of said container portions, and the rigidity of the bowed bottom is such that when flattened it exerts an inward pressure which is about one-half of the weight of the contents of the box.

The box may be suitably made from a polyolefin and preferably from polyethylene. In particular the bottom may preferably be formed from high density polyethylene of 60 to 70 mil thickness and the top of relatively softer low density polyethylene.

It may eventually be economic to produce this same system using medium or even high impact polystyrene resin. This could be the case if the cost of polyolefins were to be increased while that of polystyrene were reduced.

In accordance with another aspect the present invention provides a fish packing system comprising one or more substantially flat inner boxes adapted to contain a plurality of fish, each of said boxes comprising a bottom, side walls, and end walls, and a top forming a water-tight seal with said side walls and end walls, said inner boxes being formed of thermoplastic material; and an insulating outer box adapted to contain a plurality of said inner boxes. The insulating outer box is preferably formed from foamed thermoplastic material such as expanded polystyrene. The outer insulating box should preferably provide space for solid coolant such as ice. The insulating outer box should preferably be made from a strong corrugated cardboard.

In accordance with still a further aspect the present invention provides a fish packing system including an inner compartment area, an intermediate refrigerating area and an outer insulating and protective area, and comprising the following elements:

(a) One or more flat inner boxes adapted to contain a plurality of fish, each of said boxes comprising a bottom, side walls, and end walls, and a top forming a water-tight seal with said side walls and end walls, said inner boxes being formed of thermoplastic material, (b) A thermoplastic closable overwrap bag adapted to contain one or more of said inner boxes as well as ice refrigerant, (c) An insulating and protective outer box.

The outer box will preferably be formed of corrugated cardboard provided with a water-proof coating such as polyethylene on one or more surfaces thereof.

Each of the flat inner boxes is preferably provided with a membrane top peripherally heat sealed to an integral outwardly extending flange on the side walls and end walls. The membrane may extend beyond the flange whereby two such heat sealed flat boxes may be affixed in top to top contact by a second heat seal adhering the two respective top membranes together around the perimeter of the flanges.

The foamed thermoplastic material may suitably be expanded polystyrene of 1 to 1½ inches thickness and approximately 2 pound per cubic foot density. This may suitably be Styrofoam or Pelaspar, which are trademarks of Dow Chemical Company of Canada, for odorless, tasteless and nontoxic polystyrene plastics. Pelaspar consists of free flowing small beads or granules of polystyrene containing an expanding agent, which when expanded by the application of heat, produce an opaque foam. The outer box should also preferably provide a space for a solid coolant such as ice. The entire assembly may preferably be contained within an external cardboard shell such as a kraft paper box made of corrugated paper having approximately two hundred to three hundred pound test strength, which will provide additional strength to the foamed outer box.

Four of the inner boxes may be placed inside this outer box along with approximately fifty pounds of ice. The polyethylene inner box keeps the fish out of contact of the fresh water produced by the melting of the ice and will give the retail fish dealer a very pleasant container well adapted to displaying the fish for sale.

The inner box has been especially designed for the transportation of fresh fish. The container portion of these boxes may preferably be designed to stack at a stacking space of one-half inch, and stacking lugs may be utilized to facilitate this function.

In a preferred form the fish-containing boxes are formed from a combination of high density polyethylene and low density polyethylene to give the desired rigidity, strength and flexibility. The bases of the boxes are molded of high density polyethylene while the covers are molded from a low density polyethylene. This is desirable because the base must be stiff, rigid and strong and be easy to handle as a flat unit for retail display while the cover must remain flexible so as to render the application and removal of the cover as easy as possible to the user. Although the flat fish boxes are used for fish only once, these boxes would find a good after-market in such industries as hot-house horticulture.

One feature of a preferred embodiment of the flat fish box adapted to contain 20 lbs. of fish fillets is that the bottom is bowed to exert approximately a ten pound force against the fish fillets as they are packed. This is designed particularly to apply just sufficient pressure against the fish fillets so as to ensure that the fillets will not tend to tumble over and become entangled and damaged, thus presenting the retail fish dealer with a very unpleasant and unmarketable product. The fish should be firmly held without appreciably bowing of the top.

By the use of the present invention the amount of ice necessary for shipping fish can obviously be greatly reduced, probably by about 60%. On this basis the normal payload of about 16,000 lbs. of fish now placed in a 3,500 cubic foot box car should be at least doubled.

Aside from the fact that the payload of fish shipments from the coastal area to inland markets is increased a very beneficial advantage will flow from the fact that the present fish package is extremely easy to handle and also substantially leak proof and therefore it no longer contaminates rail cars or trucks. There will be practically no odor of fish even in the case of lost cars and this should have a great effect in reducing the cost of the transportation of fish.

As a result of the present water-proof pack, fish packers will now be able to prechill their fish shipments without incurring undue capital expenditure. Fish is currently packed at an average temperature of 55° Fahrenheit and prechilling to 32° has been under consideration for many years. The very high cost of chilling equipment has prevented widespread use of this practice. However, with the present container, fish packers are now able to cool the boxes of fish in brine tanks maintained at 28° to 32° Fahrenheit. It appears that no more than two hours is required to drop the temperature to 32° Fahrenheit. A brine tank is a very inexpensive item to build and brine solutions are abundant in all fish packing operations. By prechilling the fish to 32° Fahrenheit, the fish packer may make more advantageous use of air shipments, using a small amount of ice. In this manner he will be able to reach customers further afield than he is now doing so. Moreover, with the fish prechilled at 32° Fahrenheit there is a saving of approximately 15% in the amount of ice used for current shipments using rail and truck.

Such prechilled fish may be maintained for up to a week in inventory before it becomes imperative to ship the fish or freeze it if no immediate markets for fresh fish are available.

In the drawings that accompany this specification:

Figure 1:
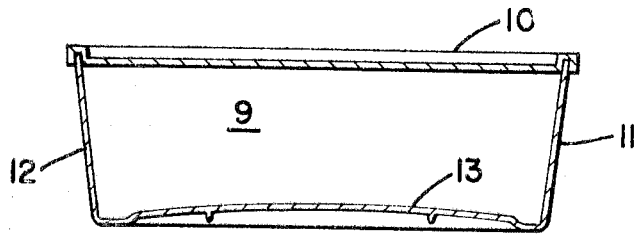
FIG. 1 shows a lateral cross section of a preferred form on an inner box of the present invention.

Referring to FIG. 1, the box 9 has a top 10, sides 11 and 12 and bottom 13. The bowed construction of the bottom 13 is clearly illustrated in this figure.

Figure 2:
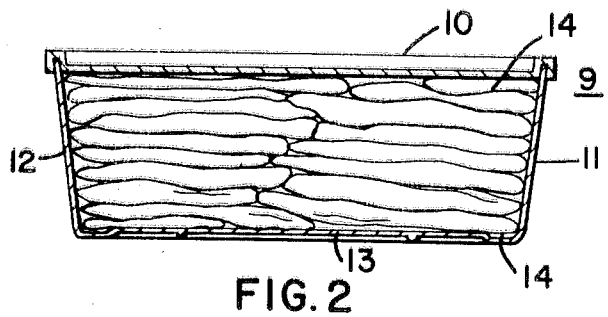
FIG. 2 shows the same lateral cross section of the box full of fish.

FIG. 2 shows the same box 9 in which the bottom 13 is now substantially flat as a result of the pressure of the weight of fish fillets 14 packed in said box 9.

Figure 3:
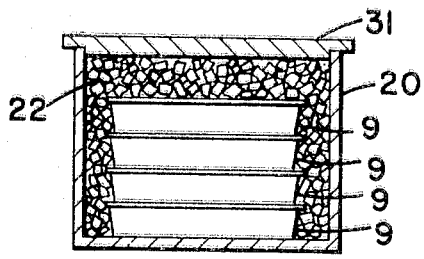
FIGS. 3 and 4 show a partial cross section of outer boxes each containing a plurality of inner boxes together with ice.

FIG. 3 shows four boxes 9 in an outer foamed insulating box 20 having an insulating top 21. Ice particles 22 are positioned above and around boxes 9, 9, 9, 9 for cooling thereof.

Figure 4:
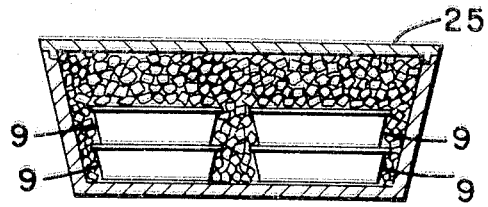

FIG. 4 shows four boxes 9 in an outer foamed insulating box 24 having an insulating top 25. Ice particles 22 are positioned above and around boxes 9, 9, 9, 9 for cooling thereof.

Figure 5:
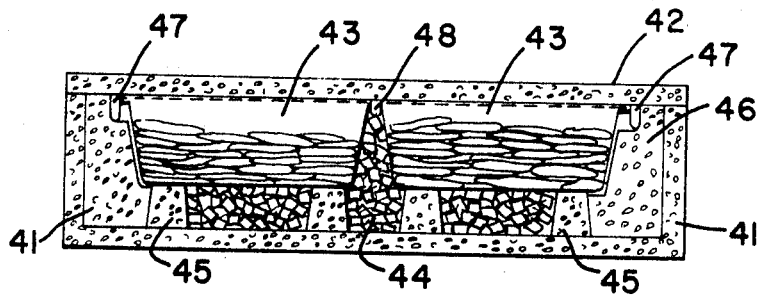
FIGS. 5 and 6 show semi-schematically an elevation and a plan view of another embodiment showing an outer box containing four inner boxes together with ice.
Figure 6:
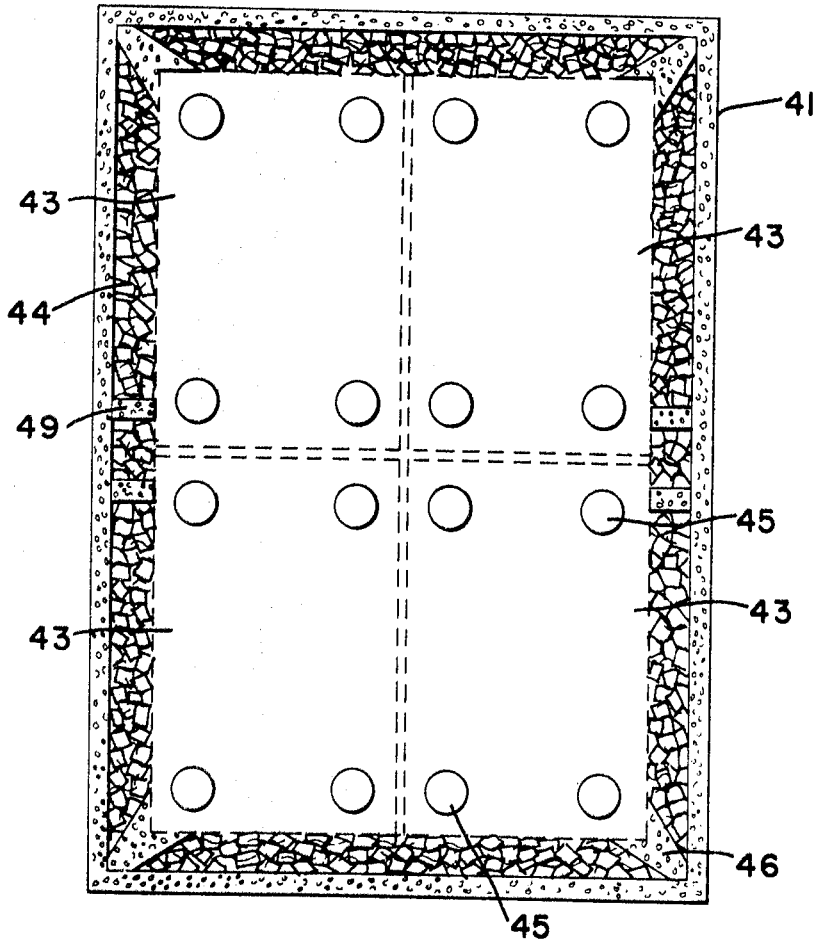

FIGS. 5 and 6 show an outer foamed insulating box 41 provided with a fitted cover 42, four identical fish containing boxes 43 are disposed within the foamed outer box and are surrounded by ice particles 44 together with the water resulting from melting of the ice. The fish boxes 43 are retained in position by supporting pillars 45, corner posts 46, side posts 49, and downwardly extending positioning flanges 47 and 48 integral with top 42.

Figure 7:
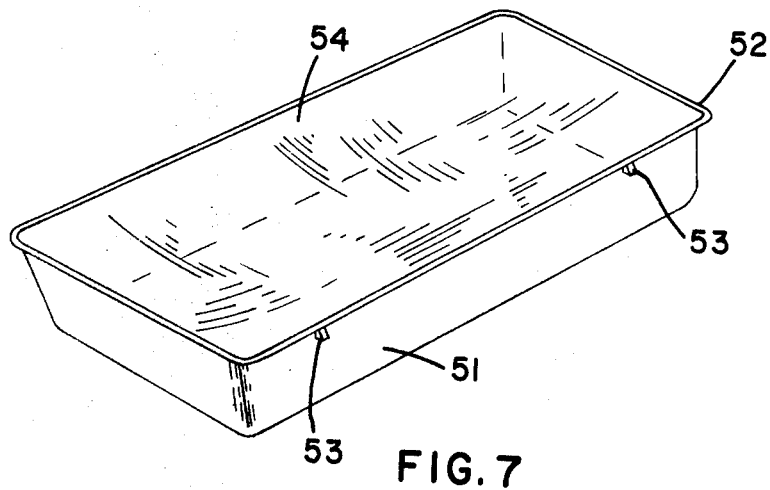
FIG. 7 is a perspective view of another embodiment of the inner box wherein the top is a membrane heat sealed to the side and top walls.

FIG. 7 shows a further embodiment of the present invention wherein a flat box 51 adapted to contain 20 lbs. of fish is provided with an outwardly extending flange 52 around the side and ends thereof. In the embodiments shown the flange 52 is reinforced at eight points around the periphery of the box by reinforcing fillets 53, which also provide a stop member which prevents the boxes 51 from nesting too tightly during storage of the empty boxes. The box is sealed after filling with fish by the application of a thin flexible membrane top 54. Membane 54 is sealed to the box all around its periphery by conventional heat sealing techniques. Polyethylene sheet of eight mils thickness has been found to be satisfactory for the membrane 54. In certain applications it may be desirable to use thicker sheet for this membrane in order to provide greater strength and to ensure adequate thickness of plastic around the heat sealing area. The use of a membrane of polyethylene sheet heat sealed to the fish box results in a completely water-proof container. The cost of this system will be found to be much lower than the cost of the snap-on type of cover used in embodiments shown in FIGS. 1 and 2. The sealed box of fish as shown in FIG. 7 may be sold as such in a suitable container or in a suitable container along with ice. Two of these containers can conveniently be affixed together in face to face contact so that the membrane tops are adequately protected against injury or perforation thereof. The two boxes can be held together in face to face relationship by the use of any suitable means for example the use of weftless tape. The box and flanges may be provided with locating lugs in order to facilitate the location of one box upon another.

Care must be taken to ensure that the flanges do not become unduly distorted by the use of tape encircling two boxes in such face to face contact.

Figure 8:
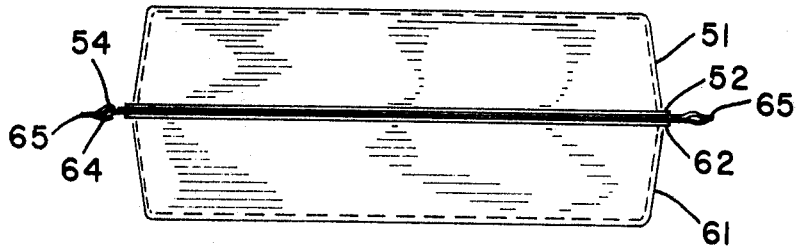
FIG. 8 shows a variation on the embodiment shown in FIG. 7 wherein two separate boxes are affixed together in face to face contact.

FIG. 8 shows a preferred form of the present invention in which each box is sealed by means of a membrane as outlined above. However, in accordance with the present embodiment the membrane extends outwardly beyond the flange and when two such sealed boxes are placed in face to face contact a second peripheral heat seal is applied at or beyond the flanges so as to hold these two boxes together. In FIG. 8 each of the fish containing boxes 51, 61 is provided with flange 52, 62 and each is peripherally heat sealed to a membrane 54, 64. The membranes 54 and 64 are then heat sealed to each other at heat seal 65 which extends peripherally all around the pair of boxes outside of flanges 52 and 62.

Figure 9:
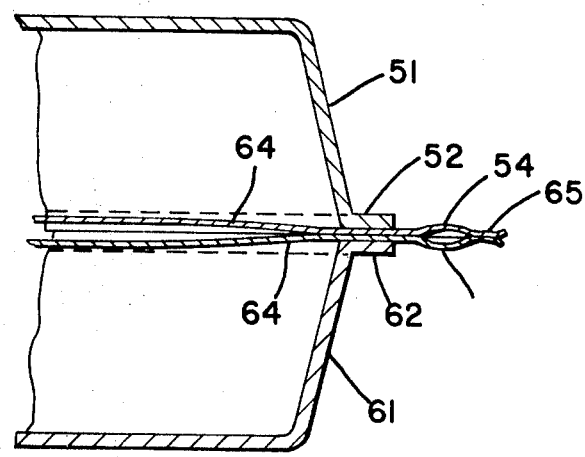
FIG. 9 is a section showing a detail of the edge of the pair of boxes shown in FIG. 8.

FIG. 9 shows in cross section a detail of the flange area of FIG. 8. FIG. 9 is not to scale and the space between membranes 54 and 64 is exaggerated for purposes of clarity.

Figure 10:
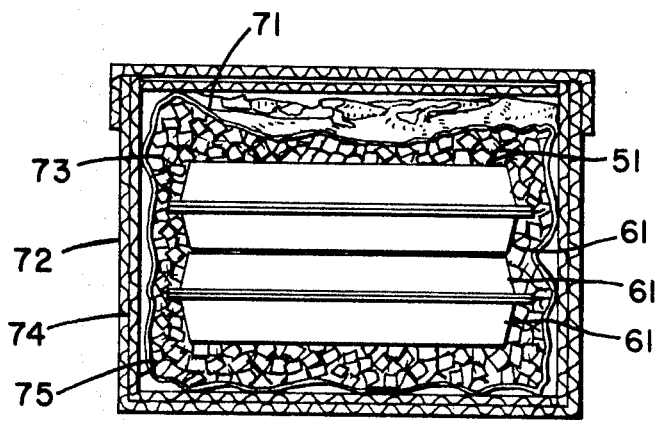
FIG. 10 shows semi-schematically in cross-section a box containing four inner packs of fish together with ice in an over-wrap bag.

FIG. 10 shows a preferred embodiment of the fish-packing system. In FIG. 10 each of the four boxes 61 is heat sealed with a membrane as shown in FIG. 7 and is affixed in face to face contact with a second box 61, preferably in the manner shown in FIGS. 8 and 9. The four 20 lb. containers are placed in a plastic bag 71 in a protective container 72 formed of corrugated cardboard. Ice 73 is also provided in the plastic bag 71 in sufficient quantities to provide the necessary cooling effect to keep the fish at a low temperature during storage and transportation to the retail outlet. In the embodiments shown in FIG. 10 the shipping container is made from "B" flute kraft cardboard composing the outside layer 74 and an "A" flute kraft liner 75. The kraft cardboard is preferably coated on one or more of its surfaces with a two to three mil polyethylene vapor barrier or a hot welt paraffin coating. Plastic overwrap bag 71 is preferably a 6–8 mil double sealed polyethylene bag. The complete fish-packing system shown in FIG. 10 represents a system which has met widespread commercial acceptance.

I claim:
1. A packing system, including an inner compartment area, an intermediate refrigerating area, and an outer insulating and protective area, and comprising the following elements:
   (a) one or more flat inner boxes formed of thermoplastic material, each of said boxes comprising a bottom, side walls, and end walls, and being provided with a membrane top peripherally heat sealed to an integral outwardly extending flange on the side walls and end walls;
   (b) a thermoplastic closable overwrap bag adapted to contain one or more of said inner boxes as well as ice refrigerant; and
   (c) an insulating and protective outer box.

2. A system as in claim 1 in which the outer box is formed of cardboard.
3. A system as in claim 1 wherein the outer box is formed of corrugated cardboard provided with a waterproof coating on the inside.
4. A system as in claim 1 wherein the outer box is formed of corrugated cardboard provided with a waterproof polyethylene coating on the inside and outside thereof.
5. A system as in claim 1 wherein the membrane extends beyond the flange and wherein two such heat sealed boxes are affixed in top to top contact by a second heat seal adhering the two respective top membranes together around the perimeter of the flanges.
6. A system as in claim 5 wherein the outer box is formed of corrugated cardboard provided with a waterproof polyethylene coating on the inside and outside thereof.
7. A packing system comprising: two substantially flat boxes, each of said boxes comprising a bottom, side walls and end walls, and being provided with a membrane top peripherally heat-sealed to an integral outwardly extending flange on the side walls and end walls; said membrane extending beyond said flange; said boxes being formed of thermoplastic material and wherein two such boxes are fixed in top-to-top contact by a second heat seal adhering the two respective top membranes together around the perimeter of the flanges.

References Cited
UNITED STATES PATENTS

| | | | |
|---|---|---|---|
| 1,890,771 | 12/1932 | Drummond | 62—372 |
| 2,184,336 | 12/1939 | Devine | 206—4 |
| 2,618,937 | 11/1952 | Francis | 206—46 X |
| 3,006,165 | 10/1961 | Mittelberger | 62—371 |
| 3,145,112 | 8/1964 | Boegershaushen | 206—62 X |
| 3,216,832 | 11/1965 | King. | |
| 3,232,491 | 2/1966 | Hunt | 217—62 X |
| 3,236,206 | 2/1966 | Willinger. | |
| 3,263,891 | 8/1966 | Brugh | 229—3.1 |
| 3,327,882 | 6/1967 | Andrews. | |
| 3,416,692 | 12/1968 | Cline et al. | |

MARTHA L. RICE, Primary Examiner

U.S. Cl. X.R.

206—46, 56, 65; 220—17, 23.83; 229—14